April 7, 1936.   A. P. BERGSTRAND   2,036,454
COUPLER
Filed June 18, 1934
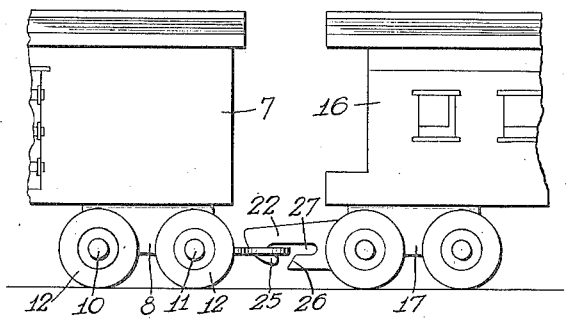
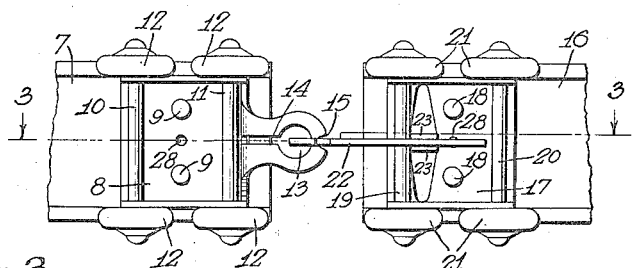
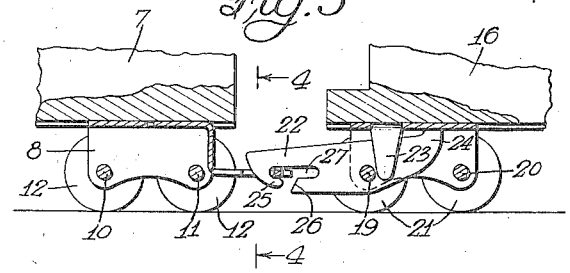
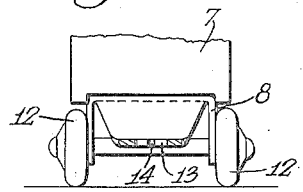
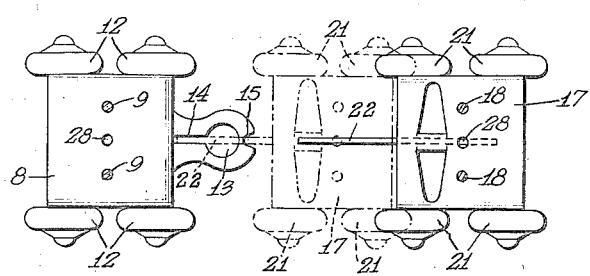
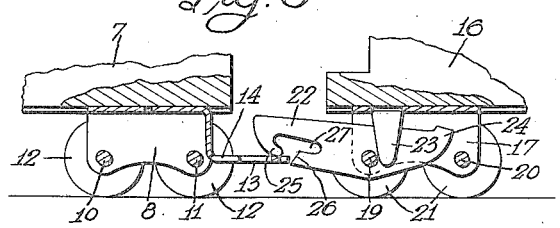
Inventor:
Andrew Peter Bergstrand
By: Wm O Belt
Atty.

Patented Apr. 7, 1936

2,036,454

UNITED STATES PATENT OFFICE 2,036,454

COUPLER

Andrew Peter Bergstrand, Moline, Ill., assignor to Strombeck-Becker Manufacturing Company, Moline, Ill., a corporation of Illinois Application June 18, 1934, Serial No. 731,033

3 Claims. (Cl. 213—179)

This invention relates to car couplers and is especially adapted for use with toy cars.

The principal object of the invention is to couple automatically cars when they are brought together in alignment with each other.

Other objects are to hold the coupled cars in alignment and prevent zig zagging when they are being pushed; to couple cars only when the cars are in alignment with each other; and to prevent accidental disconnection of the coupler during movement of the cars.

A further object is to provide a novel coupler of economical construction and simple and positive operation.

In the drawing I have illustrated a selected embodiment of the invention as used with toy cars.

Fig. 1 is a side elevation of the coupler and two trucks showing end portions of two cars coupled with my invention.

Fig. 2 is a bottom plan view of Fig. 1.

Fig. 3 is a sectional view on the line 3—3 of Fig. 2.

Fig. 4 is a sectional view on the line 4—4 of Fig. 3.

Fig. 5 is a top plan view of two trucks and showing the coupler uncoupled in full lines and the hooked member truck in broken lines in coupled position.

Fig. 6 is a sectional view similar to Fig. 3 showing the coupler during the coupling operation.

In the accompanying drawing the invention is shown as used with toy cars, the bodies of which may be made of a block of wood and the truck frames thereof are preferably made of sheet metal. One end of the body 7 of one car is mounted upon and fastened to the truck frame 8 by nails 9 or other suitable fastening devices. Axles 10 and 11 extend transversely of the truck and pass through openings in the side flanges of the truck frame. Wheels 12 are mounted on the end portions of the axles outside of the side flanges of the truck frame and the axles have riveted ends to hold the wheels and the axles in place in the truck frame. The outer end of the truck frame 8 is bent downwardly substantially midway between the sides of the truck and then forwardly to form the eye member of the coupler. An eye 13 is provided in the horizontally disposed portion of the eye member and an elongated slot 14 extends rearwardly from the eye to the vertical portion of said member. A notch 15 is provided at the extreme outer end of the eye member and in the periphery thereof opposite the slot 14 for a purpose to be hereinafter described.

One end of a body 16 of another car is mounted upon and fastened to a truck 17 by nails 18 or other suitable fastening devices. Axles 19 and 20 extend transversely of the truck and pass through openings in the side flanges of the truck frame. Wheels 21 are mounted on the end portions of the axles outside of the side flanges of the truck frame and the axles have riveted ends to hold the wheels and the axles in place in the truck frame. A hook member 22 has an opening therein intermediate the ends thereof and through which the axle 19 passes to pivotally mount the hook member on said axle. Prongs 23 are struck down from the top of the truck frame and lie along side of opposite sides of the hook member and adjacent the axle 19 to centrally locate the hook member on the axle and to hold the hook member against movement along the axle. The arm on one side of the hook member extends beneath the truck frame and provides a stop arm 24 adapted to engage the underside of the truck frame to limit the downward movement of the opposite and outwardly disposed arm of the hook member and to position the arcuate end thereof so that it may engage the eye member on movement of the cars toward each other. A downwardly and rearwardly extending hook 25 is provided at the end of the outwardly disposed arm of the hook member which arm is longer than the arm 24 so that the weight thereof will hold the outwardly disposed arm in lowered position as defined by engagement of the abutment arm 24 and the truck frame. The outer end edge of the hook member is made arcuate around the outside of the hook so that when the cars are pushed together the arcuate edge will ride through the notch 15 and pivot the hook member about the axle 19 to raise the hook which passes over the adjacent part of the eye member until it extends over the eye 13 into which it will drop to couple the cars. An upwardly inclined edge 26 is provided in the hook member opposite the free end of the hook to facilitate and insure the proper engagement of the hook with the eye. This inclined edge extends below the hook 25 and will engage the outer periphery of the eye member in the event that friction or the like prevents the hook from dropping to enter the eye. The engagement of the inclined edge with the periphery of the eye member will positively cause the hook to move downwardly to drop the hook into the eye. A slot 27 is provided in the hook member opposite the undercut portion of the hook 25 to enable the eye member to pass thereinto when the cars are being pushed and at which time the hook will pass into the slot 14 of the eye member. The passage of the hook and eye members into the respective slots aligns these coupler parts and causes the cars to remain in alignment and prevents zig zagging of the cars when they are being pushed.

The width of the eye member between the eye 13 and the outer periphery thereof is greater than the distance between the end of the hook 25 and the inclined edge 26. The notch 15 is provided in the periphery of the eye member to lessen this width so that the hook may drop into coupling engagement with the eye 13. The cars must therefore be placed in alignment with each other to enable coupling engagement if the coupling operation is to be made automatic and without picking the cars up and without any manual manipulation of the coupler.

An opening 28 is provided in the top of the truck frame so that the body of the cars may be fastened to the truck therethrough if a pivotal connection is desired. One end of each car may have an eye member thereon and the opposite end of the car may have a hook member thereon so that a train of coupled cars may be made up.

My invention provides that the cars may be coupled by merely pushing them together and without any manual handling of the coupler and which after being coupled may be pushed as well as pulled without the cars becoming disaligned and without zig zagging. The coupler will not be accidentally disengaged inasmuch as the weight of the outer end of the hook member will hold this end down and in engagement with the eye and if for any reason the hook tends to rise or remain in raised position the inclined edge 26 will force the end down to engage the hook with the eye thereby requiring that the only disengagement will be an intentional disengagement.

While I have illustrated and described a selected embodiment of my invention, it is to be understood that this is capable of variation and modification and I therefore do not wish to be limited to the precise details set forth but desire to avail myself of such changes and alterations as fall within the scope of the following claims.

I claim:

1. A toy railway car including a truck having an axle mounted therein, a hook member pivotally mounted on said axle, and prongs depending from said truck and engaging said hook member to centrally locate said hook member on said axle.

2. A toy railway car including a sheet metal truck having an axle mounted therein, a hook member pivotally mounted on said axle, and sheet metal prongs integral with said truck depending therefrom and engaging said hook member to centrally locate said hook member on said axle.

3. In a toy railway car adapted for use with another car having an eye member at one end thereof and wherein the eye member has a slot extending rearwardly from the eye thereof, a body, and a truck at one end of said body, the combination of a hook member pivotally mounted on said truck, and means positioning said hook member to guide the hook thereof into the eye of the eye member when the cars are moved toward each other, the hook member moving into the slot in the eye member to maintain the cars in alignment and prevent zigzagging of the cars when they are pushed.

ANDREW PETER BERGSTRAND.